(12) United States Patent
Butterworth

(10) Patent No.: US 10,275,901 B2
(45) Date of Patent: *Apr. 30, 2019

(54) SYSTEMS AND ASSOCIATED METHODS FOR MEASURING THE LENGTH OF A FISH

(71) Applicant: NAVICO HOLDING AS, Egersund (NO)

(72) Inventor: Paul Butterworth, Auckland (NZ)

(73) Assignee: NAVICO HOLDING AS, Egersund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/490,411

(22) Filed: Apr. 18, 2017

(65) Prior Publication Data

US 2017/0330342 A1  Nov. 16, 2017

Related U.S. Application Data

(63) Continuation of application No. 15/150,898, filed on May 10, 2016, now Pat. No. 9,928,611.

(51) Int. Cl.
*G01N 33/00* (2006.01)
*G06T 7/60* (2017.01)
(Continued)

(52) U.S. Cl.
CPC .............. *G06T 7/60* (2013.01); *G01B 11/02* (2013.01); *G01B 11/022* (2013.01); *G06T 7/62* (2017.01);
(Continued)

(58) Field of Classification Search
CPC ............. A01K 61/00; G06T 7/00; H04N 5/00
(Continued)

(56) References Cited

U.S. PATENT DOCUMENTS

| 4,753,031 A | 6/1988 | Owen |
| 9,020,416 B2 | 4/2015 | Wills |

(Continued)

FOREIGN PATENT DOCUMENTS

| GB | 2201772 A | 9/1988 |
| JP | 2011-220797 | 11/2011 |

OTHER PUBLICATIONS

International Search Report and Written Opinion of the International Searching Authority for corresponding International Application No. PCT/IB2017/052706 dated Jul. 3, 2017.

(Continued)

*Primary Examiner* — Abolfazl Tabatabai
(74) *Attorney, Agent, or Firm* — Nelson Mullins Riley & Scarborough LLP

(57) ABSTRACT

Embodiments of the present invention seek to provide an accurate way to measure the length of a fish. Some embodiments of the present invention propose utilizing a known length of a marker within a camera view or picture to determine the length of the fish also shown in the same camera view or picture. This determination could be performed in real-time or later remotely. Further, the measurement of the length of the fish is reliable because it is not dependent on a zoom value or angle of the camera and there is no required measurement device. Further, the technique is easy to use and can be performed with a camera phone or tablet.

20 Claims, 6 Drawing Sheets

(51) Int. Cl.
  *G01B 11/02* (2006.01)
  *H04N 5/232* (2006.01)
  *G06T 7/62* (2017.01)
  *A01K 97/00* (2006.01)

(52) U.S. Cl.
  CPC ..... *H04N 5/23216* (2013.01); *H04N 5/23293* (2013.01); *A01K 97/00* (2013.01); *G06T 2207/10004* (2013.01); *G06T 2207/30204* (2013.01)

(58) Field of Classification Search
  USPC .................................................. 382/134, 110
  See application file for complete search history.

(56) References Cited

U.S. PATENT DOCUMENTS

| | | | | |
|---|---|---|---|---|
| 9,137,977 | B2 * | 9/2015 | Davidson | A01K 85/01 |
| 9,367,930 | B2 | 6/2016 | Chamberlain et al. | |
| 9,476,758 | B2 * | 10/2016 | Jones | G06T 1/0007 |
| 9,928,611 | B2 * | 3/2018 | Butterworth | G06T 7/60 |
| 2006/0005460 | A1 | 1/2006 | Bittrick | |
| 2008/0140234 | A1 | 6/2008 | Shafter | |
| 2013/0274906 | A1 | 10/2013 | Shafter | |
| 2014/0270395 | A1 | 9/2014 | Jones et al. | |
| 2014/0307086 | A1 | 10/2014 | Ota et al. | |
| 2015/0055827 | A1 | 2/2015 | Bailey | |
| 2015/0316367 | A1 | 11/2015 | Castaneda et al. | |

OTHER PUBLICATIONS

Yegor Kurbachev; Photo Meter—Picture Measuring App available at: https://itunes.apple.com/nz/app/photo-meter-picture-measuring/id579661082?mt=8.

Augmented reality Open Cv; available at https://www.youtube.com/watch?v=-mhdMoPInf8&feature=youtu.be.

"FishDuel Announcement Smartphone Measuring" dated Mar. 11, 2016, all enclosed pages cited. Retrieved from <https://www.facebook.com/FishDuel/>.

"FishDuel Beta Test Tournament" dated May 2, 2016, all enclosed pages cited. Retrieved from <https://www.facebook.com/FishDuel/>.

* cited by examiner

SYSTEMS AND ASSOCIATED METHODS FOR MEASURING THE LENGTH OF A FISH

RELATED APPLICATION(S)

This application claims priority to and is a continuation of U.S. patent application Ser. No. 15/150,898, filed on May 10, 2016, and entitled "Systems and Associated Methods for Measuring the Length of a Fish", the contents of which are hereby incorporated by reference in its entirety.

FIELD OF THE INVENTION

Embodiments of the present invention relate generally to systems, computer program product, and associated methods for measuring the length of a fish.

BACKGROUND OF THE INVENTION

Fisherman have long been interested in measuring the length of a fish that was caught. Such a measurement can be used for general record keeping, bragging rights, or during a competition. Obtaining an accurate and fair measurement of the fish can be difficult without the physical fish. However, bringing the fish back for an official measurement can also be undesirable and sometimes impractical. As such, Applicant has developed methods and systems detailed herein to provide an easy to use and reliable way to measure the length of a fish.

BRIEF SUMMARY OF THE INVENTION

Ensuring an accurate measurement of the length of a caught fish can be difficult. To prove a length of the fish, often times, a fisherman may take a picture of the fish along with a special ruler or other measurement device. However, a number of factors make such a measurement system difficult. First, the measurement device must be close enough to the physical fish to ensure the ability to measure the fish. Second, the measurement device and fish must still be readable within the picture. This can prove difficult depending on a number of different factors, such as the size of the fish, the angle of the picture, the weather conditions, the type of measurement device, the condition of the fish, among other things. Further, it is still possible to alter the measurement, such as by making a fraudulent measurement device (e.g., a portion of the measurement device may be covered up by the fish and could be shortened).

Embodiments of the present invention seek to provide an easy to use and reliable way to measure the length of a fish. Using computer vision and augmented reality techniques, some embodiments of the present invention propose utilizing known parameters of a camera and a known length of a marker within a camera view or picture to determine the length of the fish also shown in the same camera view or picture. Such a determination of the length of the fish could be performed in real-time or later remotely. Additionally, the measurement of the length of the fish is reliable because it is not dependent on a zoom value or angle of the camera and there is no required measurement device. Further, the technique is easy to use and can be performed with a camera phone or tablet.

An example embodiment of the present invention includes an apparatus comprising a processor, a memory including computer program code, and a camera. The memory and the computer program code are configured to, with the processor, cause the apparatus to receive user input indicating a desire to measure a length of a fish. The memory and the computer program code are configured to, with the processor, cause the apparatus to determine if an image of a marker is present with an image of the fish within a camera view for use with taking a picture using the camera, wherein the camera defines at least one camera parameter. The memory and the computer program code are configured to, with the processor, cause the apparatus to determine a length of the marker, determine a length of the image of the marker, determine a length of the image of the fish, and determine the length of the fish based on the length of the marker, the length of the image of the marker, and the length of the image of the fish.

In some embodiments, the memory and the computer program code are further configured to, with the processor, cause the apparatus to determine the length of the marker by determining a first theoretical plane associated with the image of the marker and determining a length associated with the image of the marker within the first theoretical plane. Additionally, the memory and the computer program code are further configured to, with the processor, cause the apparatus to determine the length of the fish by determining a conversion rate between the length associated with the image of the marker in the first theoretical plane and the known length of the marker, determining a second theoretical plane associated with the image of the fish, determining a length associated with the image of the fish within the second theoretical plane, and converting the length associated with the image of the fish in the second theoretical plane to the length of the fish based on the determined conversion rate.

In some embodiments, the memory and the computer program code are further configured to, with the processor, cause the apparatus to determine the length of the fish by determining a number of pixels associated with the length of the image of the marker, determining a conversion rate between pixels and length based on the number of pixels associated with the length of the image of the marker and the known length of the marker, determining a number of pixels associated with a length of the image of the fish, and converting the number of pixels associated with the length of the image of the fish to the length of the fish.

In some embodiments, the memory and the computer program code are further configured to, with the processor, cause the apparatus to cause display of fish measurement guidelines in conjunction with the camera view and determine the length of the image of the fish based on the known length of the measurement guidelines in an instance in which the image of the fish through the camera viewer is positioned in accordance with the measurement guidelines. Additionally, in some embodiments, the memory and the computer program code are further configured to, with the processor, cause the apparatus to determine if the image of the fish through the camera viewer is positioned in accordance with the measurement guidelines and provide an indication in an instance in which the image of the fish through the camera viewer is positioned in accordance with the measurement guidelines.

In some embodiments, the memory and the computer program code are further configured to, with the processor, cause the apparatus to receive user input indicating a front of the image of the fish and a back of the image of the fish and determine the length of the image of the fish based on the indicated front and back of the image of the fish.

In some embodiments, the memory and the computer program code are further configured to, with the processor, cause the apparatus to display the length of the fish on a display.

In some embodiments, the memory and the computer program code are further configured to, with the processor, cause the apparatus to determine data associated with a machine-readable code from the marker, wherein the data includes the length of the marker.

In some embodiments, the memory and the computer program code are further configured to, with the processor, cause the apparatus to determine the length of the marker based on a pre-set length of the marker.

In some embodiments, the memory and the computer program code are further configured to, with the processor, cause the apparatus to receive user input indicating a desire to take a picture of the fish and the marker and cause, in response to receiving the user input, a picture to be taken.

In some embodiments, the memory and the computer program code are further configured to, with the processor, cause the apparatus to transmit the picture and the plurality of camera parameters to a remote device for determination of the size of the fish.

In some embodiments, the memory and the computer program code are further configured to, with the processor, cause the apparatus to record, in response to receiving the user input indicating a desire to take the picture, at least one of time, location, or date associated with the picture.

In some embodiments, the at least one camera parameter includes at least one of field of view, number of pixels, lens size, lens type, or lens distortion value.

Another example embodiment of the present invention includes a method for determining a length of a fish. The method comprises receiving user input indicating a desire to measure a length of a fish. The method further comprises determining if an image of a marker is present with an image of the fish within a camera view for use with taking a picture using the camera, wherein the camera defines at least one camera parameter. The method further comprises determining a length of the marker, determining a length of the image of the marker, determining a length of the image of the fish, and determining the length of the fish based on the length of the marker, the length of the image of the marker, and the length of the image of the fish. Example methods of the present invention may also include additional embodiments as described herein, such as described above with respect to the example apparatus.

A further example embodiment of the present invention includes a non-transitory computer-readable medium comprised of at least one memory device having computer program instructions stored thereon. The computer program instructions are configured, when run by a processor, to receive user input indicating a desire to measure a length of a fish. The computer program instructions are further configured, when run by a processor, to determine if an image of a marker is present with an image of the fish within a camera view for use with taking a picture using the camera, wherein the camera defines at least one camera parameter. The computer program instructions are further configured, when run by a processor, to determine a length of the marker, determine a length of the image of the marker, determine a length of the image of the fish, and determine the length of the fish based on the length of the marker, the length of the image of the marker, and the length of the image of the fish. Example computer-readable medium of the present invention may also include additional embodiments as described herein, such as described above with respect to the example apparatus.

BRIEF DESCRIPTION OF THE DRAWINGS

Figure 1:
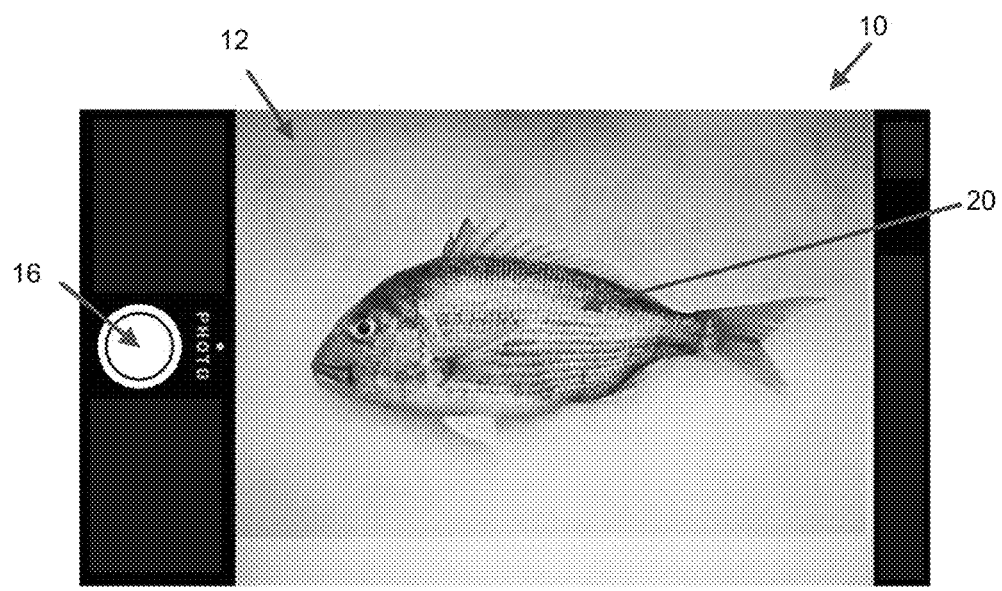
Figure 2:
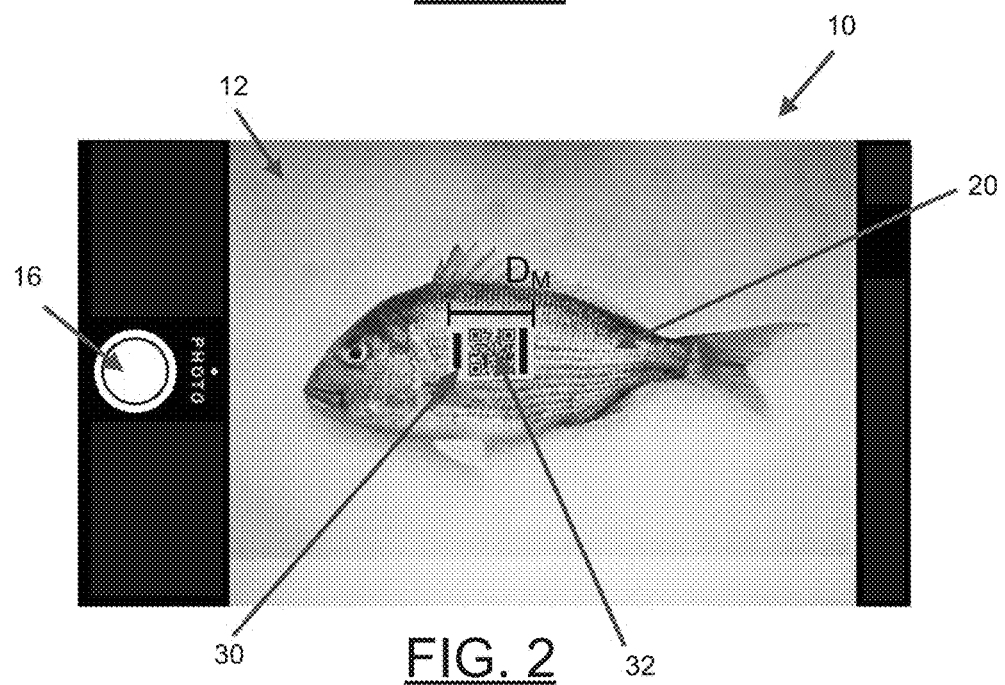
Figure 3:
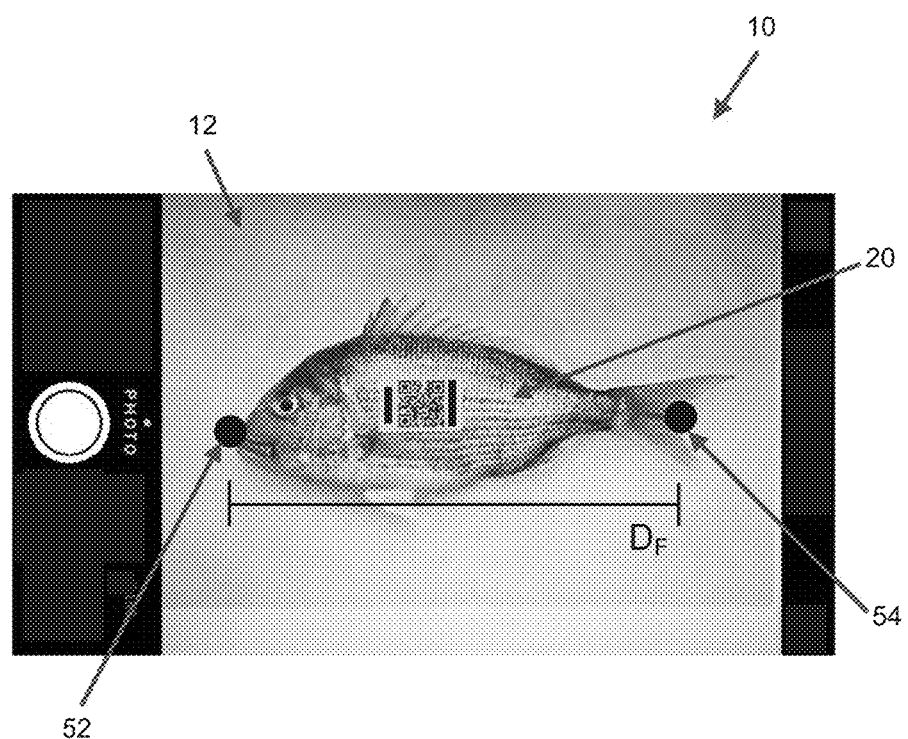
Figure 4A:
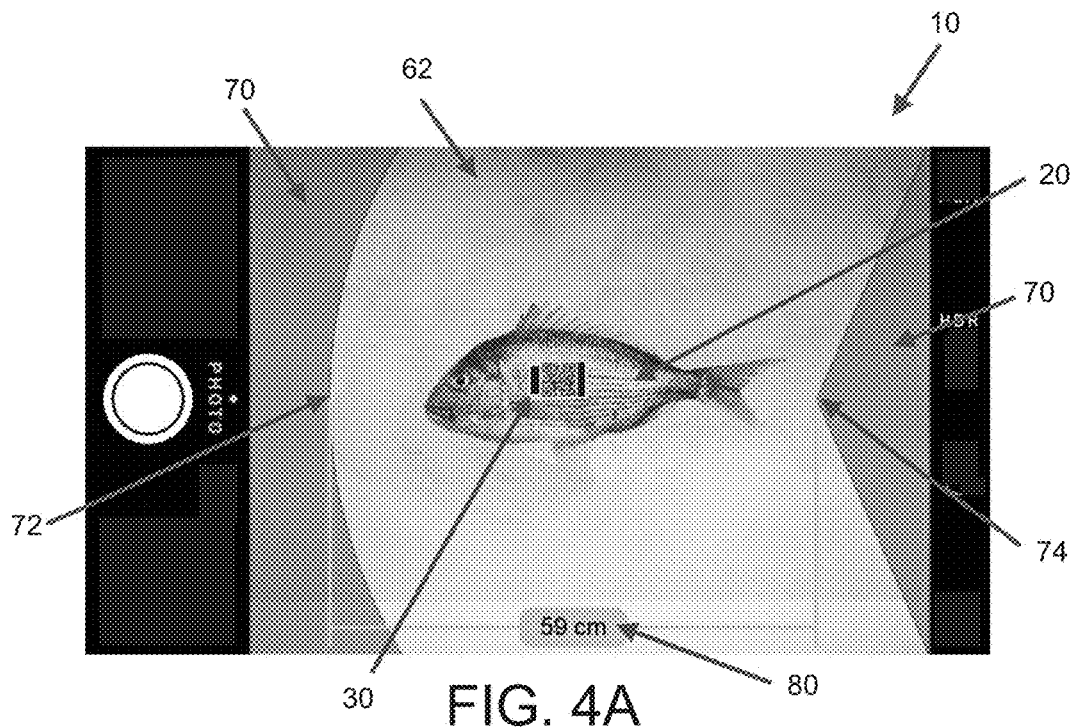
Figure 4B:
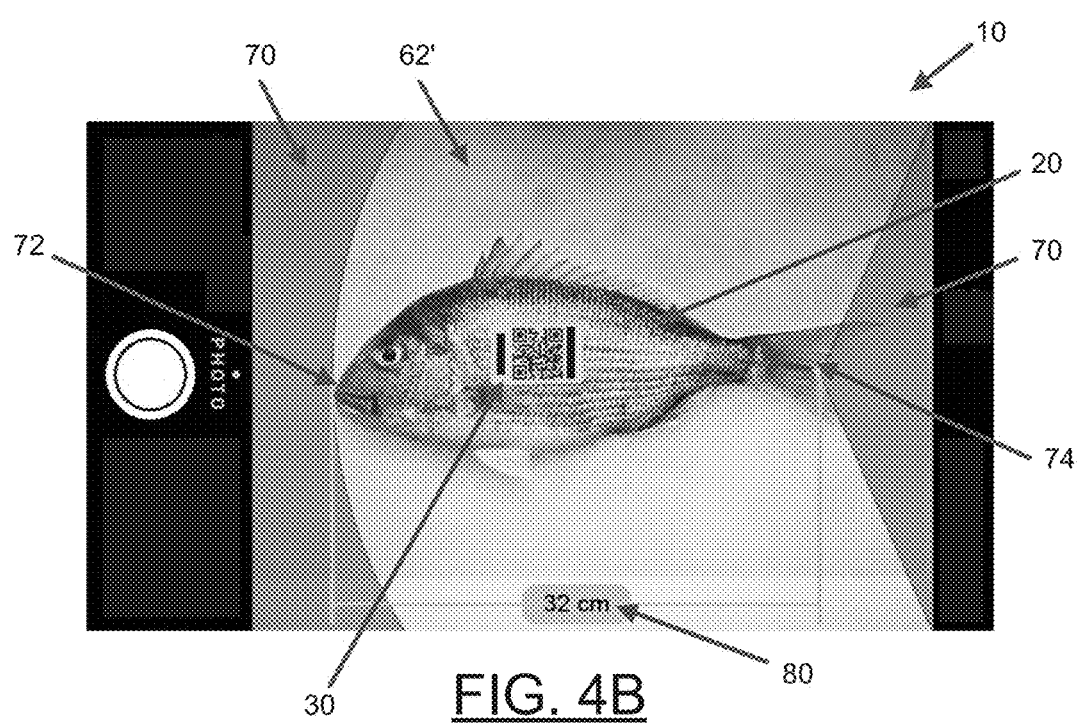
Figure 5:
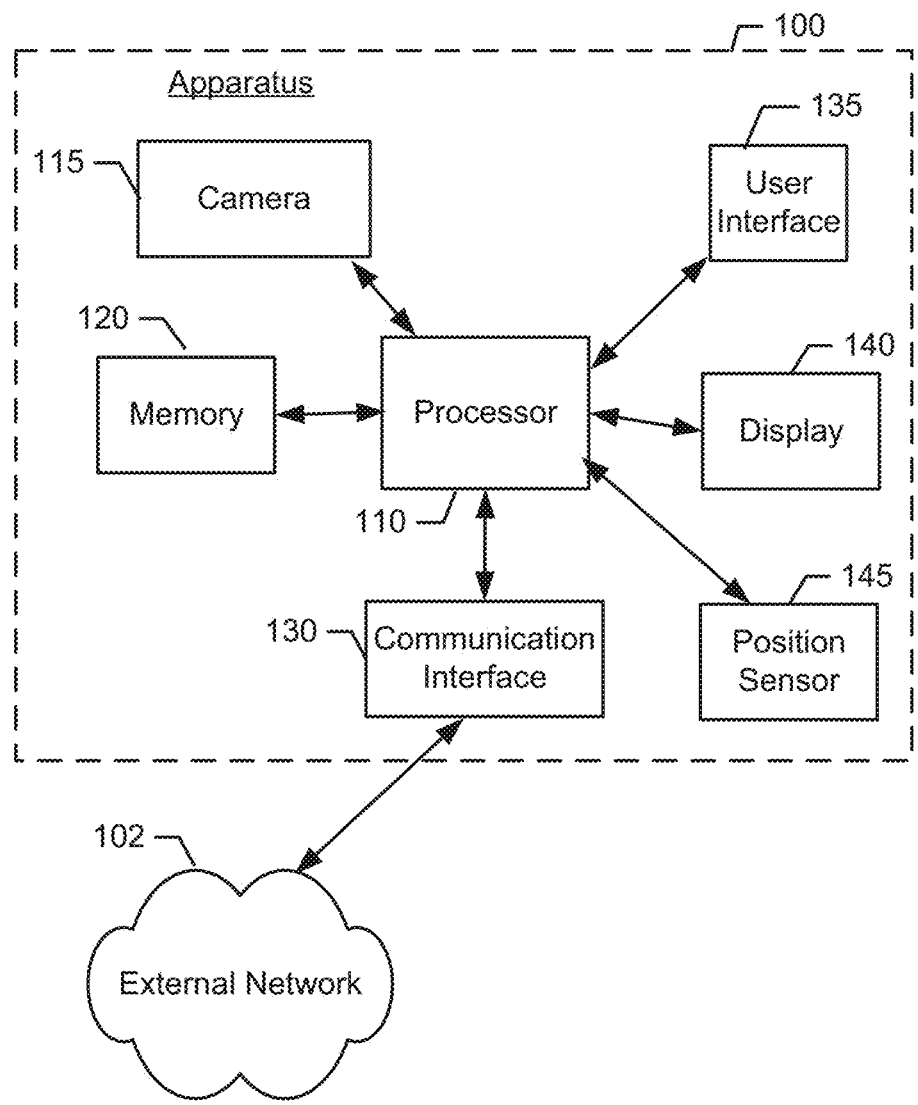
Figure 6:
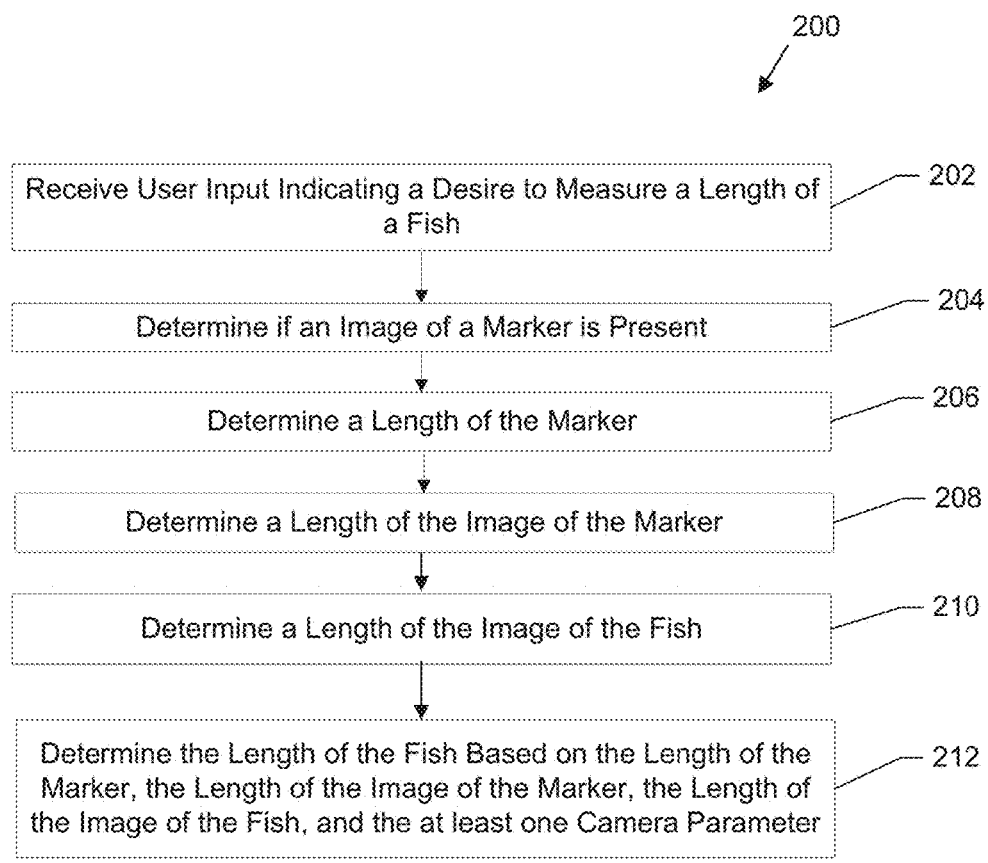
Figure 7:
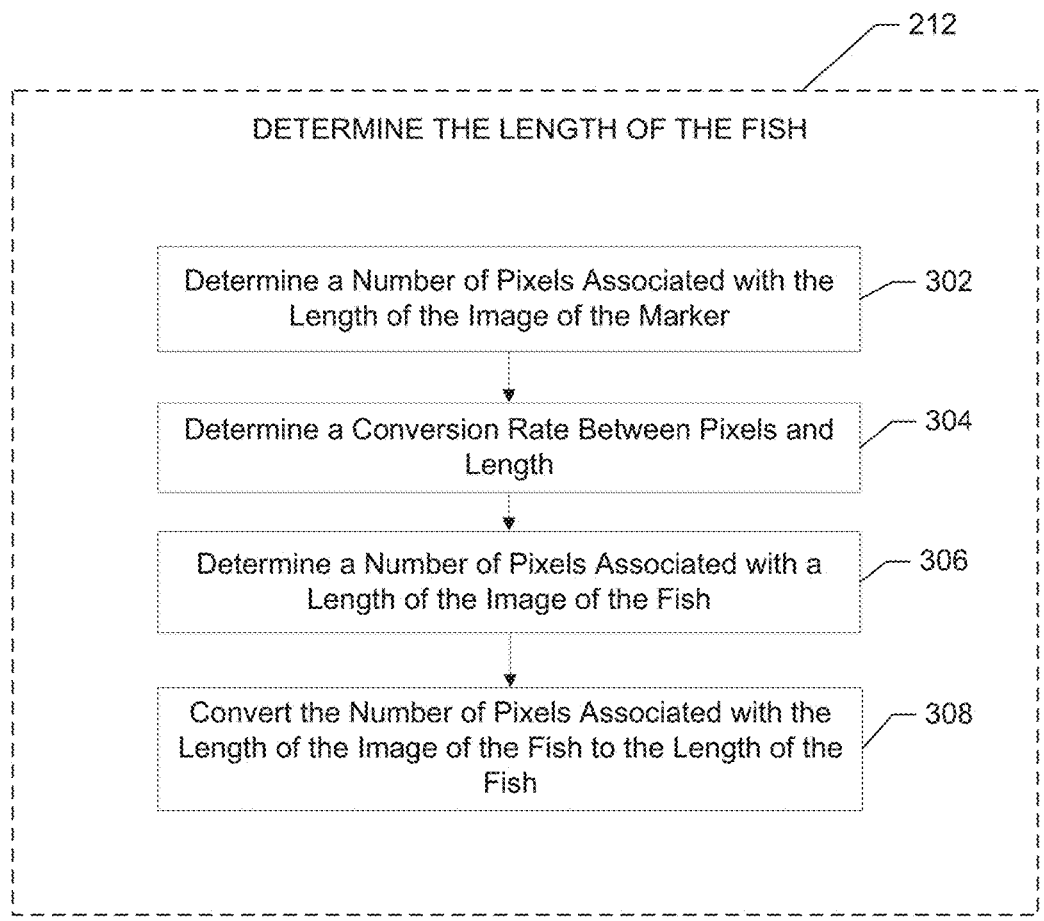

Having thus described the invention in general terms, reference will now be made to the accompanying drawings, which are not necessarily drawn to scale, and wherein:

FIG. 1 shows an example camera view of a fish, in accordance with some embodiments discussed herein;

FIG. 2 shows another example camera view of the fish along with a marker, in accordance with some embodiments discussed herein;

FIG. 3 shows another example camera view of the fish and the marker from FIG. 2, wherein a user has provided input to mark the front and the back of the fish, in accordance with some embodiments discussed herein;

FIG. 4A shows another example camera view of the fish and the marker from FIG. 2, wherein a measurement guideline is displayed in the camera view, in accordance with some embodiments discussed herein;

FIG. 4B shows the example camera view of the fish, the marker, and the measurement guideline from FIG. 4A, wherein the user has zoomed in on the fish to match the front and the back of the fish with the measurement guideline, in accordance with some embodiments discussed herein;

FIG. 5 shows a block diagram illustrating an example apparatus, in accordance with some embodiments discussed herein;

FIG. 6 illustrates a flowchart of an example method of measuring the length of a fish according to some embodiments discussed herein; and FIG. 7 illustrates a flowchart of a portion of another example method of measuring the length of a fish according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present invention utilize a camera and computer vision techniques to provide an accurate measurement of the length of a fish. Using a marker and known camera parameters, embodiments of the present invention can measure the length of objects within the picture or camera view along with the marker. In this regard, embodiments of the present invention provide an apparatus (e.g., apparatus 100 in FIG. 5), computer program product, and associated methods for measuring the length of an object, such as a fish. In this regard, though embodiments of the present invention are described with respect to determining the length of a fish, some embodiments of the present invention contemplate determining the length of any object.

In some embodiments, the apparatus 100 may be configured to receive user input (e.g., through the user interface 135) indicating a desire to measure a length of a fish. The user input may be in the form of opening an application, such as a camera application, a dedicated fish measurement application, or other application. In some embodiments, the user input may be made to a feature available in a camera application or other application. Such a feature may be accessible and indicate to the apparatus 100 that the user wishes to measure the length of a fish.

In some embodiments, the apparatus 100 may be configured to, using a camera (e.g., camera 115), present a camera view on the display (e.g., display 140). FIG. 1 shows an example apparatus 10 that is presenting a camera view 12 showing an image of a fish 20. In this regard, the image of the fish 20 represents what the camera "sees" through its lens in real-time. In a known manner, if the apparatus 10 and camera move to the left, the presented image will also move to the left. In this regard, the display is updated in real-time to show the environment that is viewable through the camera lens (e.g., a pass through display). Likewise, if a user zooms in or out on the camera view, then the corresponding presented image also zooms in or out.

In some embodiments, the user can press a button (e.g., button 16) to indicate a desire to take a picture of what is shown in the camera view. In response, the camera captures the image as a picture. While some embodiments of the present invention are described as being handled using the camera view (i.e., without an actual picture being taken), some embodiments of the present invention are also contemplated to be performed after a picture is taken, such as using stored camera parameters as will become apparent based on the description provided herein.

Using such a picture or camera view to measure the length of a fish shown in the image can be problematic and difficult to rely on for accuracy. For example, as indicated above, a user can zoom in or out. In such a regard, a later viewer of the picture does not know the zoom level that resulted in the image and cannot rely on the measurement from the image alone (e.g., a small fish can appear large if zoomed in on, etc.). Likewise, the angle of the camera can alter the perceived length of the image of the fish in comparison to the actual length of the fish.

To solve this problem, embodiments of the present invention contemplate placing a standard marker in the image and measuring the length of the marker to enable an accurate measurement of the length of the fish. Using a known length of the marker and determining the length of the image of the marker within the camera view/picture, some embodiments of the present invention can determine a corresponding length of the fish that is also shown in the camera view/picture. FIG. 2 shows an example camera view 12 that shows an image of a fish 20 and a marker 30. While example embodiments described herein show a single size marker, some embodiments contemplate multiple different size markers, such as may be used depending on the size of the fish.

In some embodiments, the apparatus 100 may be configured to determine if an image of a marker is present with an image of the fish within a camera view for use with taking a picture using the camera. In some embodiments, the apparatus 100 may be configured to detect the marker in the camera view, such as using the camera 115, processor 110, and computer vision techniques to differentiate the marker from the rest of the environment viewed through the camera. In some embodiments, the apparatus 100 may be configured to recognize the marker by a machine readable code (e.g., a QR code 32 shown in FIG. 2).

In some embodiments, the apparatus 100 may be configured to determine a length of the image of the marker. For example, with reference to FIG. 2, the apparatus 100 (such as through the camera 115, processor 110, and computer vision techniques) may detect the front and back edges of the image of the marker 30 and thereby measure a length ($D_M$) of the image of the marker 30. In some embodiments, such a length may be determined to correspond to a number of pixels associated with the length of the image of the marker (though other measurement types are also contemplated). In some embodiments, such a length may be determined by determining a theoretical plane associated with the image of the marker and measuring the length of the image of the marker within that theoretical plane. Likewise, though the described embodiment focuses on the length of the marker (and fish), other dimensions, areas, and sizes are also contemplated with embodiments of the present invention.

In some embodiments, the apparatus 100 may be configured to determine a length of the marker. In some embodiments, the length of the marker may be pre-set (e.g., stored in memory 120) and accessible by the apparatus 100 (e.g., through processor 110). In some embodiments, the apparatus 100 may be configured to read and determine the length of the marker from a machine readable code (e.g., QR code 32). In this regard, the machine readable code may be read by the apparatus 100 (e.g., through the camera 115, processor 110, and computer vision techniques) when the marker is shown in the camera view (such as in FIG. 2). In such embodiments, the machine readable code may include data that includes the length of the marker.

In some embodiments, the apparatus 100 may be configured to determine other data from the machine readable code of the marker. For example, the machine readable code may include data that prevents fraudulent use, such as a specific code that can be recognized and used for verification. In this regard, various information associated with the marker can be verified (e.g., the angler/fisherman, the competition, the day, the lake, etc.). Likewise, the data from the machine readable code can include other information that may be useful (e.g., angler's name, competition, date, angler's team, etc.).

In some embodiments, as noted above, the apparatus 100 may be configured to take a picture of what is shown in the camera view. In this regard, the apparatus 100 may be configured to receive user input indicating a desire to take a picture of the fish and the marker and, in response, cause the picture to be taken.

In some embodiments, the apparatus 100 may be configured to determine other information associated with the camera view and/or the picture. For example, the apparatus 100 (such as through the processor 110, communications interface 130, and/or position sensor 145) may be configured to determine information such as a time, a location, a user identity, a date, weather data, environment data, depth data, among others, associated with the camera view and/or picture. Such information may be recorded in association with the camera view and/or picture. In some embodiments, the apparatus 100 may be configured to determine such information in response to taking the picture or receiving user input indicating a desire to take the picture.

The camera utilized with embodiments of the present invention has certain parameters that may aid in determining the length of the fish (and other determinations described herein). In this regard, the apparatus 100 may be configured to determine one or more camera parameters associated with the camera view and/or picture. For example, various camera parameters (e.g., field of view, number of pixels on the display, lens size, lens type, lens distortion value, etc.) may be useful in determining and/or verifying the length of the fish. In some embodiments, camera parameters may be further divided into camera intrinsic parameters and camera extrinsic parameters. Example camera intrinsic parameters relate to the field of view and distortion of the lens, among other things. These intrinsic parameters can be known based on the type of camera. Example camera extrinsic parameters relate to physical, variable parameters no matter the type of camera. These include the position of the camera, the zoom level, the angle, among others.

In some embodiments, the apparatus 100 may be configured to transmit (e.g., through the communication interface 130) any of the information, camera parameters, and/or picture to a remote device. In such a regard, the ultimate length of the fish may be verified and provided remotely. In some embodiments, the apparatus 100 may be configured transmit just the length of the fish (the determination of which is described in greater detail herein). Further, in some embodiments, the remote device may be configured to make the determination of the length of the fish based on received information, camera parameters, and/or the picture. As such, embodiments of the present invention contemplate determination of the length of the fish from a camera view in real-time by the apparatus or from a picture on the apparatus or a remote device. Moreover, such a determination from a picture can be made at a later time (such as at a user's home computer after the fishing trip).

In some embodiments, the apparatus 100 may be configured to determine (such as through the processor 110) a conversion rate between pixels and length based on the number of pixels associated with the length of the image of the marker and the known length of the marker. For example, as noted above, the apparatus 100 may determine the number of pixels associated with an image of the marker (e.g., $D_M$ in FIG. 2). However, the apparatus 100 may also determine the length of the marker (e.g., it may be pre-set or determined from the machine readable code). Knowing both the number of pixels associated with the image of the marker and the actual length of the marker, a conversion rate for the camera view and/or picture may be determined. Though the above described example details determining a pixel to length conversion, other measurement criteria can be used and/or determined to form a useful conversion. For example, in some embodiments, the apparatus 100 may be configured to determine a conversion rate between the length associated with the image of the marker in a determined theoretical plane associated with the image of the marker and the known length of the marker.

In some embodiments, the apparatus 100 may be configured to determine the length of the image of the fish. Embodiments of the present invention contemplate any number of ways to determine the length of the image of the fish. For example, the apparatus may be configured to distinguish (such as through the camera 115, processor 110, and computer vision techniques) the fish in the camera view to determine the front and the back for determining the length of the image of the fish. Additionally, however, other ways are contemplated, including ways that require interaction from the user. In this regard, FIGS. 3, 4A, and 4B illustrate two example ways to determine the length of the image of the fish.

In some embodiments, the apparatus 100 may be configured to determine the length of the image of the fish based on user input defining the front and the back of the fish. In such an embodiment, the apparatus 100 may determine the length of the image of the fish based on the distance between the indicated front and back of the fish. For example, FIG. 3 illustrates a situation in which the user has indicated a front of the fish at point 52 and the back of the fish at point 54. In this regard, the length of the image of the fish between point 52 and point 54 results in the distance ($D_F$). In some embodiments, such a length may be determined to correspond to a number of pixels associated with the length of the image of the fish (though other measurements are also contemplated). For example, in some embodiments, such a length of the image of the fish may be determined by determining a theoretical plane associated with the image of the fish and measuring the length of the image of the fish within that theoretical plane.

In some embodiments, the apparatus 100 may be configured to determine the length of the image of the fish based on measurement guidelines presented on the display (e.g., in the camera view). The measurement guidelines may define a front point and a back point that can be used to determine a length therebetween. For example, FIG. 4A shows an apparatus 10 presenting a camera view 62 with an image of a fish 20 and marker 30. Additionally, the camera view 62 includes measurement guidelines 70 shown in blue that define a front point 72 and a back point 74.

In some embodiments, the measurement guidelines may define a shape that corresponds to a shape of a fish such that the user can alter the position, angle, and/or zoom level of the camera view to fit the fish within the measurement guidelines. For example, FIG. 4B shows a zoomed in camera view 62' (as compared to the camera view 62 from FIG. 4A). In this regard, the user has zoomed in on the fish such that the front of the image of the fish aligns with the front point 72 of the measurement guideline 70 and the back of the image of the fish (e.g., the center of the tail) aligns with the back point 74 of the measurement guideline 70. In such an embodiment, the front part of the measurement guideline is curved for aligning with the front part of the fish and the back part of the measurement guideline forms a triangle to align with the shape of a tail of a fish.

Using the measurement guidelines, the apparatus 100 may be configured to determine the distance between the front point 72 and the back point 74. In the situation where the fish is properly aligned with the measurement guidelines, the distance between the front point 72 and the back point 74 would correspond to the length of the image of the fish (see e.g., FIG. 4B). In some embodiments, such a length may be determined to correspond to a number of pixels associated with the length of the image of the fish (though other measurements are also contemplated). For example, in some embodiments, such a length of the image of the fish may be determined by determining a theoretical plane associated with the image of the fish and measuring the length of the image of the fish within that theoretical plane.

In this regard, one way to confirm this proper alignment is through visual confirmation due to a picture that is taken. Additionally or alternatively, in some embodiments, the apparatus 100 may be configured to provide an indication to the user that the fish is properly aligned with the measurement guidelines. In this regard, in some embodiments, the apparatus 100 (such as through the camera 115, processor 110, and computer vision techniques) may be configured to determine if the image of the fish through the camera viewer is positioned in accordance with the measurement guidelines. Additionally, in some embodiments, the apparatus 100 may be configured to provide an indication in an instance in which the image of the fish through the camera viewer is positioned in accordance with the measurement guidelines. Such an indication can be any type of alert or other indication (visual, audible, etc.) that will inform the user that the image of the fish is properly aligned with the measurement guidelines.

In some embodiments, the apparatus 100 may be configured to determine the length of the fish. For example, using the length of the marker, the length of the image of the marker, and the length of the image of the fish, the apparatus 100 can determine the length of the fish. One such example involves the conversion of pixels to length. In particular, in embodiments where the conversion rate between pixels and length was determined, the apparatus 100 may determine the length of the fish by converting the determined number of pixels associated with the length of the image of the fish to distance using the conversion rate. Though pixels have been used when describing the contemplated conversion, other measurement types may be applied to embodiments of the present invention. For example, in some embodiments, the conversion rate between the length associated with the image of the marker in a determined theoretical plane associated with the image of the marker and the known length of the marker can be used for determining the length of the fish when a length associated with the image of the fish in another determined theoretical plane associated with the image of the fish has already been determined.

In some embodiments, the apparatus 100 may be configured to display the length of the fish. For example, FIG. 4B includes a display of the determined length of the fish 80 to be 32 cm. Notably, the image of the fish 20 is properly aligned with the measurement guidelines in FIG. 4B. In contrast, the image of the fish 20 in FIG. 4A is significantly smaller than necessary to properly align with the measurement guidelines. Since the distance between the front point 72 and the back point 74 of the measurement guidelines 70 is what is determined to be the length of the image that is used to determine the actual length (e.g., with the conversion rate), the determined length is greater (i.e., 59 cm). This difference is due to the camera parameters (e.g., zoom level) and is accounted for based on the conversion rate determined due to the length of the image of the marker. See, for example, the difference in size of the image of the marker in FIG. 4A versus FIG. 4B.

Example System Architecture

FIG. 5 shows a block diagram of an example apparatus 100 capable for use with several embodiments of the present invention. As shown, the apparatus 100 may include a number of different modules or components, each of which may comprise any device or means embodied in either hardware, software, or a combination of hardware and software configured to perform one or more corresponding functions.

The apparatus 100 may include a processor 110, a camera 115, a memory 120, a user interface 135, a display 140, one or more sensors (e.g., position sensor 145, orientation sensor (not shown), etc.), and a communication interface 130.

The processor 110 may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to receive user input (e.g., from the user interface 135), make various determinations, run computer program code, access/store information or data in the memory (e.g., memory 120), cause display of data (e.g., with display 140), collect or process additional data, such as time, temperature, GPS information (e.g., from position sensor 145), waypoint designations, or others, or transmit or receive information or data (e.g., from/through communication interface 130, such as to/from an external network 102).

The memory 120 may be configured to store instructions, computer program code, marine data, such as length data, sonar data, chart data, location/position data, weather data, and other data associated with the apparatus in a non-transitory computer readable medium for use, such as by the processor.

The communication interface 130 may be configured to enable connection to external systems (e.g., an external network 102). In this manner, the apparatus 100 may retrieve stored data from a remote, external server via the external network 102 in addition to or as an alternative to the onboard memory 120.

The position sensor 145 may be configured to determine the current position and/or location of the apparatus 100. For example, the position sensor 145 may comprise a GPS or other location detection system.

The display 140 may be configured to display images and may include or otherwise be in communication with a user interface 135 configured to receive an input from a user. The display 140 may be, for example, a conventional LCD (liquid crystal display), a touch screen display, mobile device, or any other suitable display known in the art upon which images may be displayed.

The camera 115 may be configured to provide a camera view of an environment. Additionally, the camera 115 may be configured to take a picture of the environment in the camera view.

In any of the embodiments, the display 140 may be configured to present a camera view, such as viewed through the camera 115. The display 140 may also be configured to present additional data (e.g., measurements, measurement guidelines, other data) on the screen.

The user interface 135 may include, for example, a keyboard, keypad, function keys, mouse, scrolling device, input/output ports, touch screen, or any other mechanism by which a user may interface with the system.

Although the display 140 of FIG. 5 is shown as being directly connected to the processor 110 and within the apparatus 100, the display 140 could alternatively be remote from the processor 110 and/or apparatus 100. Likewise, in some embodiments, the camera 115, the position sensor 145, and/or user interface 135 could be remote from the apparatus 100.

Example Flowchart(s) and Operations

Embodiments of the present invention provide methods, apparatus and computer program products for determining the length of a fish, such as with a camera. Various examples of the operations performed in accordance with embodiments of the present invention will now be provided with reference to FIGS. 6 and 7.

FIG. 6 illustrates a flowchart according to an example method for determining a length of a fish according to an example embodiment 200. The operations illustrated in and described with respect to FIG. 6 may, for example, be performed by, with the assistance of, and/or under the control of one or more of the processor 110, camera 115, memory 120, communication interface 130, user interface 135, position sensor 145, and/or display 140. Operation 202 may comprise receiving user input indicating a desire to measure a length of a fish. The processor 110, camera 115, and/or user interface 135 may, for example, provide means for performing operation 202. Operation 204 may comprise determining if an image of a marker is present along with a fish in a camera view. The processor 110 and/or camera 115 may, for example, provide means for performing operation 204. Operation 206 may comprise determining a length of the marker. The processor 110, camera 115, memory 120, and/or communication interface 130 may, for example, provide means for performing operation 206. Operation 208 may comprise determining a length of the image of the marker. The processor 110 and/or camera 115 may, for example, provide means for performing operation 208. Operation 210 may comprise determining a length of the image of the fish. The processor 110 and/or camera 115 may, for example, provide means for performing operation 210. Operation 212 may comprise determining the length of the fish based on the length of the marker, the length of the image of the marker, the length of the image of the fish, and the at least one camera parameter. The processor 110, camera 115, communication interface 130, display 140, and/or memory 120 may, for example, provide means for performing operation 212.

FIG. 7 illustrates a flowchart according to another example method for determining a length of a fish according to operation 212. Though the example embodiment shown in FIG. 7 details an example method for determining a length of a fish using a conversion between pixels and length, some embodiments of the present invention contemplate other conversion rates, such as length of the image of the marker in a determined theoretical plane and length. The operations illustrated in and described with respect to FIG. 7 may, for example, be performed by, with the assistance of, and/or under the control of one or more of the processor 110, camera 115, memory 120, communication interface 130, user interface 135, position sensor 145, and/or display 140. Operation 302 may comprise determining a number of pixels associated with the length of the image of the marker. The processor 110 and/or camera 115 may, for example, provide means for performing operation 302. Operation 304 may comprise determining a conversion rate between pixels and length. The processor 110 may, for example, provide means for performing operation 304. Operation 306 may comprise determining a number of pixels associated with a length of the image of the fish. The processor 110 and/or camera 115 may, for example, provide means for performing operation 306. Operation 308 may comprise converting the number of pixels associated with the length of the image of the fish to the length of the fish. The processor 110 may, for example, provide means for performing operation 308.

FIGS. 6 and 7 illustrate flowcharts of a system, method, and computer program product according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120 and executed by, for example, the processor 110. As will be appreciated, any such computer program product may be loaded onto a computer or other programmable apparatus (for example, apparatus 100) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, apparatus 100) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A non-transitory computer-readable medium comprised of at least one memory device having computer program instructions stored thereon, the computer program instructions being configured, when run by a processor, to:
    receive, via a mobile camera device, user input indicating a desire to measure a length of a fish using a camera view on the mobile camera device;
    present, on a display of the mobile camera device, a camera view that includes one or more measurement guidelines, wherein the fish and a marker are within the camera view such that an image of the fish and an image of the marker are presented on the display;
    cause, based on user input, adjustment of the zoom level of the camera view such that the image of the fish fits within the one or more measurement guidelines on the display;
    determine a length of the image of the marker;
    determine a length of the image of the fish; and
    determine the length of the fish based on a length of the marker, the length of the image of the marker, and the length of the image of the fish.

2. The non-transitory computer-readable medium of claim 1, wherein the computer program instructions are further configured, when run by the processor, to determine the length of the image of the fish based on the one or more measurement guidelines.

3. The non-transitory computer-readable medium of claim 2, wherein the size of the one or more measurement guidelines is known, and wherein the computer program instructions are further configured, when run by the processor, to determine the length of the image of the fish by determining a number of pixels of the display associated with the size of the one or more measurement guidelines.

4. The non-transitory computer-readable medium of claim 1, wherein the computer program instructions are further configured, when run by the processor, to determine the length of the marker.

5. The non-transitory computer-readable medium of claim 1, wherein the length of the marker is a predetermined length.

6. The non-transitory computer-readable medium of claim 1, wherein the computer program instructions are further configured, when run by the processor, to:
receive a user request to take a picture of the camera view with the image of the fish and the image of the marker; and
cause the camera to take the picture.

7. The non-transitory computer-readable medium of claim 6, wherein the computer program instructions are further configured, when run by the processor, to transmit the picture to a remote server.

8. The non-transitory computer-readable medium of claim 1, wherein the computer program instructions are further configured, when run by the processor, to determine the length of the fish by:
determining a number of pixels of the display associated with the length of the image of the marker;
determining a conversion rate between pixels and length based on the number of pixels of the display associated with the length of the image of the marker and the length of the marker;
determining a number of pixels of the display associated with a length of the image of the fish; and
converting the number of pixels of the display associated with the length of the image of the fish to the length of the fish based on the determined conversion rate between pixels and length.

9. The non-transitory computer-readable medium of claim 1, wherein the computer program instructions are further configured, when run by the processor, to determine the length of the image of the fish by determining a distance between points on the one or more measurement guidelines corresponding to a front and a back of the image of the fish.

10. A non-transitory computer-readable medium comprised of at least one memory device having computer program instructions stored thereon, the computer program instructions being configured, when run by a processor, to:
receive, via a mobile camera device, user input indicating a desire to measure a length of a fish using a camera view on the mobile camera device;
present, on a display of the mobile camera device, a camera view that includes one or more measurement guidelines, wherein the fish and a marker are within the one or more measurement guidelines in the camera view such that an image of the fish and an image of the marker are presented on the display;
determine a length of the image of the marker;
determine a length of the image of the fish based on the known length of the measurement guidelines in an instance in which the image of the fish through the camera viewer is positioned in accordance with the measurement guidelines; and
determine the length of the fish based on a length of the marker, the length of the image of the marker, and the length of the image of the fish.

11. The non-transitory computer-readable medium of claim 10, wherein the computer program instructions are further configured, when run by the processor, to:
determine the length of the marker by:
determining a first theoretical plane associated with the image of the marker; and
determining a length associated with the image of the marker within the first theoretical plane.

12. The non-transitory computer-readable medium of claim 10, wherein the computer program instructions are further configured, when run by the processor, to cause, based on user input, adjustment of the zoom level of the camera view such that the image of the fish fits within the one or more measurement guidelines on the display.

13. The non-transitory computer-readable medium of claim 10, wherein the computer program instructions are further configured, when run by the processor, to cause, based on user input, adjustment of the zoom level of the camera view such that the image of the fish fits within the camera view on the display.

14. The non-transitory computer-readable medium of claim 10, wherein the computer program instructions are further configured, when run by the processor, to:
receive user input indicating a desire to take a picture of the fish and the marker; and
cause, in response to receiving the user input, a picture to be taken.

15. The non-transitory computer-readable medium of claim 14, wherein the computer program instructions are further configured, when run by the processor, to transmit the picture to a remote device for determination of the length of the fish.

16. The non-transitory computer-readable medium of claim 10, wherein the computer program instructions are further configured, when run by the processor, to record, in response to receiving the user input indicating a desire to take the picture, at least one of time, location, or date associated with the picture.

17. The non-transitory computer-readable medium of claim 10, wherein the computer program instructions are further configured, when run by the processor, to determine the length of the marker.

18. The non-transitory computer-readable medium of claim 10, wherein the length of the marker is a predetermined length.

19. A method for determining a length of a fish, the method comprising:
receiving, via a mobile camera device, user input indicating a desire to measure a length of a fish using a camera view on the mobile camera device;
causing presentation, on a display of the mobile camera device, a camera view that includes one or more measurement guidelines, wherein the fish and a marker that is proximate the fish are within the camera view such that an image of the fish and an image of the marker are presented on the display;
causing, based on user input, adjustment of the zoom level of the camera view such that the image of the fish fits within the one or more measurement guidelines on the display;
determining a length of the image of the marker;
determining a length of the image of the fish; and
determining the length of the fish based on a length of the marker, the length of the image of the marker, and the length of the image of the fish.

20. The method of claim 19, wherein determining the length of the image of the fish comprises determining a distance between points on the one or more measurement guidelines corresponding to a front and a back of the image of the fish.

* * * * *